G. G. FLOYD.
BRAKE.
APPLICATION FILED JUNE 11, 1914.
1,135,512.
Patented Apr. 13, 1915.
3 SHEETS—SHEET 1.
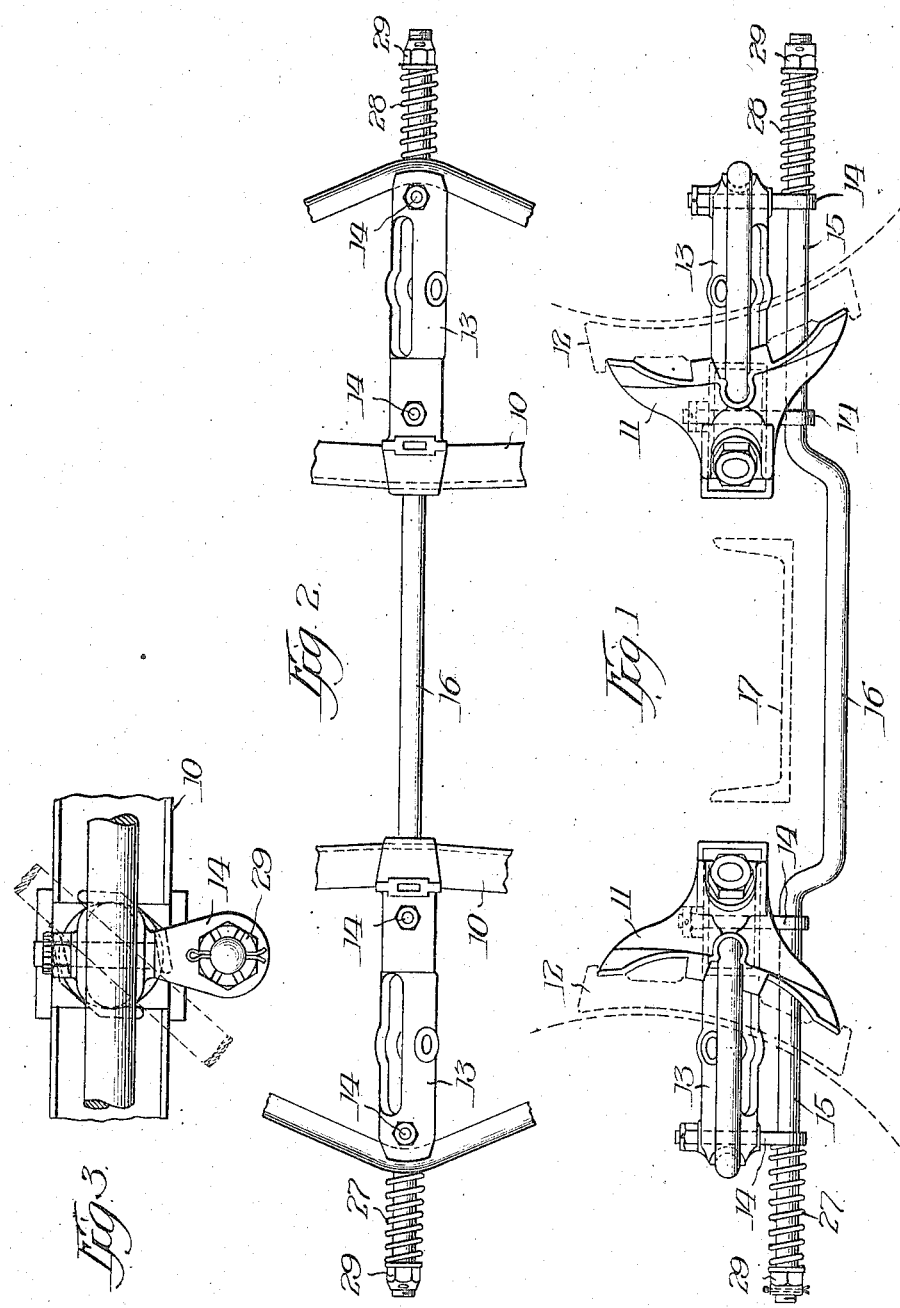

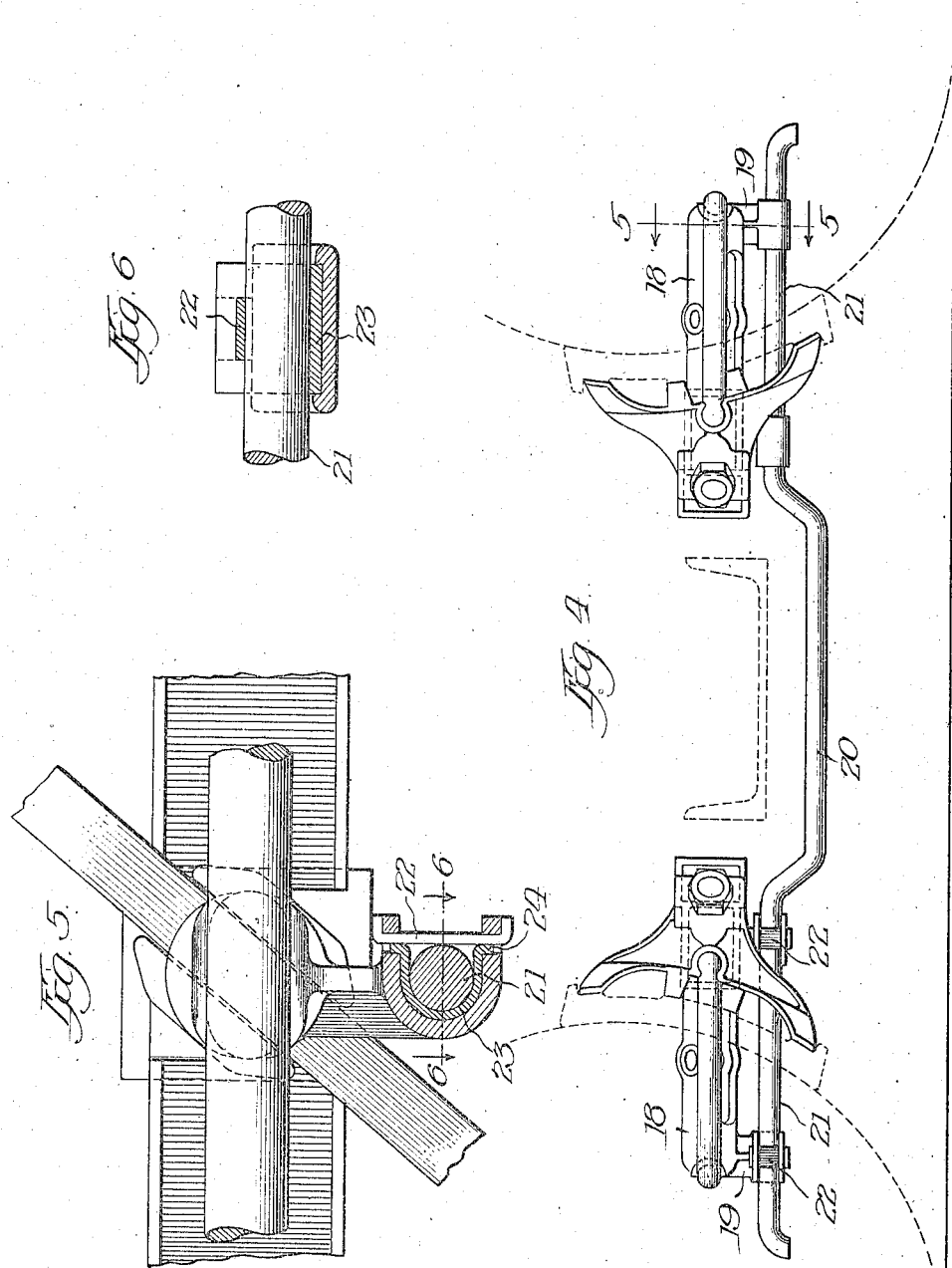

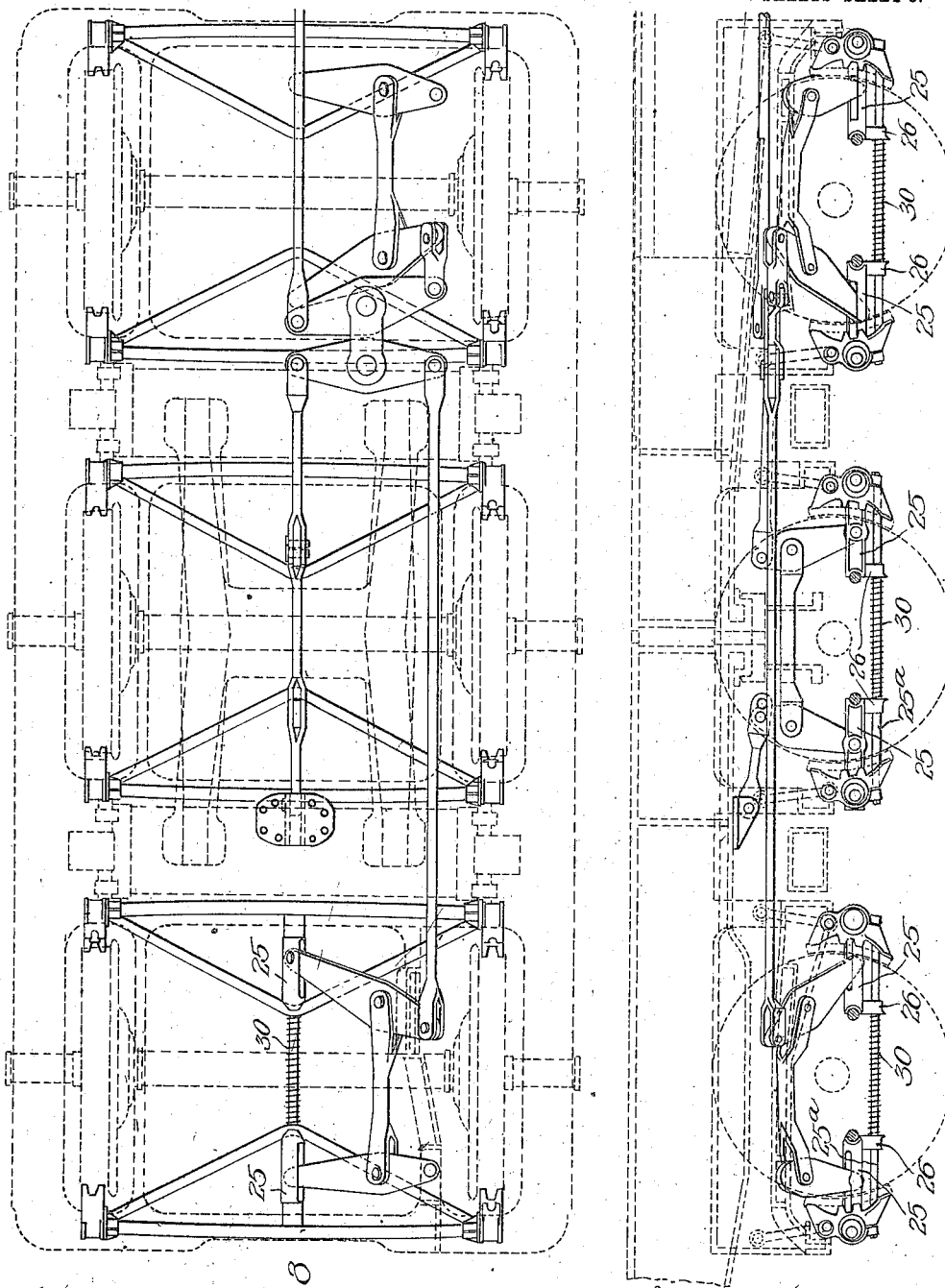

UNITED STATES PATENT OFFICE.

GEORGE G. FLOYD, OF CHICAGO, ILLINOIS, ASSIGNOR TO AMERICAN STEEL FOUNDRIES, OF NEW YORK, N. Y., A CORPORATION OF NEW JERSEY.

BRAKE.

1,135,512.

Specification of Letters Patent.  Patented Apr. 13, 1915.

Application filed June 11, 1914. Serial No. 844,435.

*To all whom it may concern:*

Be it known that I, GEORGE G. FLOYD, a citizen of the United States, and resident of Chicago, in the county of Cook and State of Illinois, have invented certain new and useful Improvements in Brakes, of which the following is a specification.

My invention relates to railway cars and has particular reference to a novel brake beam leveling device and spring release for the brakes thereof.

It has been found desirable to employ certain means in connection with railway brakes for maintaining brake beams in a fixed angular relation to the wheels, the object in such arrangement being to provide means whereby the brake shoes shall likewise be applied to the wheels at the proper point to induce evenness of wear and further, to prevent the sagging of the beams and the consequent wearing of one corner or point of the shoe on the wheel when the brakes are released. This not only causes a retardation of the car and consequent waste of power but induces wear on the shoe thus reducing its area of contact and shortening its useful life.

A brake beam leveling device in order to be practical and of small cost should be exceedingly simple, which shall require no adjustment after being applied and which may be readily applied by unskilled mechanics.

My device is of such simple construction that it cannot be mis-applied and is adapted for use on either four or six wheeled trucks or in connection with the usual clasp brake arrangement.

The device consists essentially of a rod extending beneath adjacent brake beams and having sliding engagement with two points of each beam. Thus it will be seen that after the hangers of the beams have been constructed of the proper length, the two adjacent beams so connected, while free to move horizontally as required, are maintained strictly in parallelism thus preventing any possibility of sagging or non-alinement.

A further object in the construction of a device of this sort is to provide a simple spring release. In my device I have provided a spring release in connection with the leveling device, the parts being so simple and economical in construction as to obviate many of the well known objections. This device consists essentially in a helical spring disposed on the end of the leveling rod and exerting a force tending to project the beam away from the wheels. Neither the leveling device nor the spring release need be connected to any part of the car truck and either thereof may be readily released from the beam when required.

The invention will be more readily understood by reference to the accompanying drawings, wherein, Figure 1 is a side elevation of my novel leveling device and spring release as applied to two wheels of a truck; Fig. 2 is a fragmentary plan view of the same construction; Fig. 3 is an end elevation; Fig. 4 is a view similar to Fig. 1, showing a slightly modified construction in which the spring release feature is omitted; Fig. 5 is an enlarged section on the line 5—5 of Fig. 4; Fig. 6 is an enlarged fragmentary view on the line 6—6 of Fig. 5; Fig. 7 is a side elevation of a further modification of the device as applied to a six-wheeled truck having clasp brakes, and Fig. 8 is a plan view of the same.

Referring now more particularly to Figs. 1, 2 and 3, it will be seen that I provide brake beams 10, of a preferred form, to which heads 11, are secured these heads carrying shoes 12. Projecting downwardly from the strut 13 of the beam are eye-bolts 14, the eyes of the bolts being located in alinement and accommodating the end 15 of a rod, the middle portion 16, of which may be bent downward to pass freely beneath a spring plank 17, or other similar connecting part of the truck. The arrangement thus far described will operate efficiently as a brake beam leveling device. No fastening devices need be provided on the ends of the rod unless desired. The brake beams each being provided with two points of contact or engagement with the rod, are maintained in parallelism and cannot by any possibility sag; that is, one side of the beam cannot tilt as the brake shoes or wheels wear down. The beams are permitted to reciprocate freely on the rod as required. The rod may be removed from the beams by loosening the fastening nuts by means of which the eye-bolts 14, are held in place.

A slightly modified construction is shown in Figs. 4, 5 and 6, in which the fastening bolts are omitted. In place thereof the brake beam strut 18, is provided with integral downward projections 19, having a recess therein which is open on the side. It will be noted that the projections 19, on all the beams have their openings facing in the same direction. However, when the beams are applied the openings face in opposite directions. A rod 20, similar to the rod shown in Figs. 1 and 2, is provided, the ends 21, of which rest in the open sided recesses in the projections 19, and are held in place by means of keys 22, which are driven in place and the ends thereof bent over. A spring bushing 23, may be provided within the recess this bushing, as shown in Fig. 5, having ears 24, which seat in the recesses formed for the reception of the pin 22. It will be noted that by this arrangement, that is, the provision of recesses opening in opposite directions on adjacent beams, that the rod may be located without disturbing the beams, merely by removing the keys and twisting the rod about an imaginary point near its center. Furthermore, even though two of the keys 22, should become lost or broken, the rod could not become displaced due to the peculiar mounting of the rod in the beams.

The same construction is shown in a modified form in Figs. 7 and 8, wherein the application is made to a six-wheeled clasp brake. In this case the rod 25ª, extends between the struts 25, of the brake beams which are applied to a single wheel, the rod being projected through thimbles 26, preferably formed integral with the struts. Thus the two beams are maintained in exact parallelism at all times.

In the construction of Figs. 1, 2, 7 and 8, I have shown my novel spring release for the brakes which may consist, as shown in Figs. 1 and 2, of coiled springs 27, 28, located on the opposite ends of the rod 16, one end of the springs bearing against a nut 29, and the other end against the eye of the bolt 14. The two beams are thus forced toward each other, the tendency being to retract the shoes from the wheels when the braking force is relieved. This forms an exceedingly simple and economical brake release and one which may be applied to all brake equipment. It will not be of such excessive cost as would preclude its employment with the cheaper equipment. In the construction of Figs. 7 and 8, a spring 30, is threaded on the rod 25ª, a single spring being sufficient. However, if desired two shorter springs may be employed, abutments for the ends of which being provided by the use of a pin or similar device passing through the rod. This simple construction obviates the necessity for a long, pendent leaf spring, will be found much cheaper in installation and simpler to maintain.

A bar which is shown as extending between adjacent beams is shown as a round member inasmuch as such form will probably be found satisfactory and desirable. However, the same result might be secured by using a square or other shaped member and such modification is contemplated in the use of the term "rod" in the appended claims.

Obviously many other modifications may be made than those herein shown and such modifications as are within the scope of my claims I consider within the spirit of my invention.

I claim:

1. In a railway brake, the combination of adjacent brake beams, and a leveling device extending between said beams and having an inclosing bearing at two points on each beam, substantially as described.

2. In a railway brake, the combination of two beams, each thereof having a thimble, and a rod extending between the beams and bodily movable with the same, said rod acting to maintain the beams in parallelism, substantially as described.

3. In a railway brake, the combination of adjacent brake beams, a pair of thimbles carried by each beam, said pair of thimbles being substantially in horizontal alinement and a rod extending between the beams and having its ends seated in said thimbles, substantially as described.

4. In a railway brake, the combination of a pair of brake beams, each thereof having a plurality of depending eyes, and a rigid rod extending between the beams and having its ends seated in said eyes, substantially as described.

5. In a railway brake, the combination of a wheel having beams mounted on both sides thereof, and a rod extending between said beams and having a bearing at at least two points on each beam whereby said beams are maintained in parallel relation, substantially as described.

6. In a railway brake, the combination of wheels having brake beams mounted on both sides thereof, said beams being provided with extended bearing surfaces, and a rod mounted in said bearing surfaces and extending between adjacent beams said rod being adapted to maintain said beams in parallel relation, substantially as described.

7. In a railway brake, the combination of wheels, a pair of brake beams mounted for engagement with said wheels, said beams being provided with bearing surfaces of substantial length, and a rod mounted in said bearings and extending between adjacent beams, said rod being adapted to maintain said beams in parallelism, substantially as described.

Signed at Chicago, Cook county, Illinois. this 8th day of June, 1914.

GEORGE G. FLOYD.

Witnesses:
CHAS. F. MURRAY,
T. D. BUTLER.